United States Patent [19]

Kawamura et al.

[11] Patent Number: 5,213,903
[45] Date of Patent: May 25, 1993

[54] TIN-PLATED STEEL SHEET WITH A CHROMIUM BILAYER AND A COPOLYESTER RESIN LAMINATE AND METHOD

[75] Inventors: Hiroaki Kawamura, Kudamatsu; Masatoki Ishida; Atsuo Tanaka, both of Tokuyama; Terunori Fujimoto, Kudamatsu; Tsuneo Inui, Tokuyama; Yoshikazu Kondo, Kudamatsu, all of Japan

[73] Assignee: Toyo Kohan Co., Ltd., Tokyo, Japan

[21] Appl. No.: 869,904

[22] Filed: Apr. 15, 1992

Related U.S. Application Data

[63] Continuation of Ser. No. 543,036, Jun. 22, 1990, abandoned.

[51] Int. Cl.$^5$ .............................................. B32B 15/08
[52] U.S. Cl. ...................................... 428/623; 428/626; 428/648
[58] Field of Search ............... 428/621, 623, 626, 648; 220/458

[56] References Cited

U.S. PATENT DOCUMENTS

| | | | |
|---|---|---|---|
| 4,517,255 | 5/1985 | Kanda et al. | 428/626 |
| 4,579,786 | 4/1986 | Nakakouji et al. | 428/648 |
| 4,735,835 | 4/1988 | Taira et al. | 220/458 |
| 4,816,348 | 3/1989 | Kawamura et al. | 428/648 |
| 4,957,820 | 9/1990 | Heyes et al. | 428/458 |
| 4,980,210 | 12/1990 | Heyes | 428/461 |
| 5,094,924 | 3/1992 | Matsui et al. | 428/648 |

Primary Examiner—George Wyszomierski
Attorney, Agent, or Firm—Felfe & Lynch

[57] ABSTRACT

A copolyester film was laminated onto a steel sheet, this sheet having double layers consisting of a lower layer of metallic chromium and an upper layer of hydrated chromium oxide on a tin plated steel sheet in which 5 to 40% of the surface of the steel sheet is covered with plated tin and exposed steel surface and a space between plated tin particles is 0.5 to 50 μm, and a method for production of this copolyester resin film laminated steel sheet which comprises: (a) electroplating with tin under restricted conditions, (b) formation of said double layer on plated tin and exposed steel surface and (c) lamination of the copolyester resin film at above the melting temperature of tin.

This copolyester resin film laminated steel sheet is suitable for applications wherein excellent corrosion resistance after severe forming is required, such as deeply drawn cans, drawn and redrawn cans, drawn and stretch formed cans, drawn and partially ironed cans and can ends in which a tab for easy opening is attached.

8 Claims, 2 Drawing Sheets

TIN-PLATED STEEL SHEET WITH A CHROMIUM BILAYER AND A COPOLYESTER RESIN LAMINATE AND METHOD

This application is a continuation of application Ser. No. 543,036, filed Jun. 22, 1990, abandoned.

FIELD OF THE INVENTION

The present invention relates to a copolyester resin film laminated steel sheet having excellent corrosion resistance after severe forming, and a method for its production. The present invention relates to a copolyester resin film laminated steel sheet having double layers consisting of a lower layer of metallic chromium and an upper layer of hydrated chromium oxide (TFS film) on a tin plated steel sheet which is characterized by the state of plated tin, and a method for production of this copolyester resin film laminated steel sheet which is characterized by an electroplating with tin under restricted conditions, by the formation of the above TFS film onto the plated tin as well as the exposed surface of steel sheet and by the lamination of said copolyester resin film on one or both sides of the surface treated steel sheet which has been heated to above the melting temperature of tin just before the lamination of the copolyester resin film.

BACKGROUND AND OBJECTIVE

At present, metal sheets such as electrotinplate, tin free steel and aluminum sheet are widely used for can stock after being coated, at least once, with lacquer. This lacquer coating is disadvantageous from an energy standpoint as significant time is required for curing the lacquer and large volumes of solvent discharged during the lacquer curing process must be burned in another furnace in order to prevent air pollution.

Recently, lamination of thermoplastic resin film on a metal sheet was attempted in order to avoid these problems. For example, the methods shown in Japanese Patent Publication Nos. Sho 61-3676 and Sho 60-47103, Laid-Open Japanese Patent Application Nos. Sho 61-149341 and Hei 1-249331 are already known.

Japanese Patent Publication No. Sho 60-3676 relates to a process for lamination of a polyester resin film onto a tin plated steel sheet which comprises preliminarily laminating the polyester resin film to a tin plated steel sheet at below the melting temperature of tin, and then reheating the laminate at above the melting temperature of tin in order to completely bond the film to the tin plated steel sheet.

Japanese Patent Publication No. Sho 60-47103 relates to a process for lamination of a crystalline polyester resin film to a metal sheet such as tin free steel and electrotinplate by heating the sheet above the melting point of said polyester resin film and thereafter immediately quenching the laminate.

Laid-Open Japanese Patent Application Nos. Sho 61-149341 and Hei 1-249331 relate to a process for lamination of a polyester resin film precoated with a special adhesive, such as an epoxy resin containing a curing agent to a metal sheet such as tin free steel and electrotinplate which has been heated below or above the melting temperature of said polyester resin film.

The electrotinplate covered with the polyester resin film obtained by these patents above is not suitable for applications wherein excellent corrosion resistance after severe forming is required because the adhesion of the polyester resin film after severe forming is inferior to that in the polyester resin film laminated tin-free steel. Particularly, in the electrotinplate in which the polyester resin film is laminated at above the melting temperature of tin, the adhesion of the polyester resin film after severe forming is noticeably poor, because it is considered that the adhesion between the tin layer and metallic chromium layer, which is present on the tin layer, becomes poor by melting of a tin or an iron-tin alloy layer which forms by heating during the lamination of the polyester resin film is destroyed by severe forming. In the electrotinplate in which the polyester resin film is laminated at below the melting temperature of tin, the laminated polyester resin film is easily peeled off by severe forming, even if said TFS film is formed on a plated tin layer, because the adhesion of the tin layer to the metallic chromium layer formed on the plated tin layer is poor compared with the adhesion of the metallic chromium layer to the steel surface in tin-free steel.

On the other hand, in the polyester resin film laminated tin free steel obtained by these patents described above, the laminated polyester resin film is not peeled off by severe forming, if the polyester resin film having excellent formability is laminated. However, in the process wherein the polyester resin film is laminated on tin-free steel or the polyester resin film laminated tin-free steel is formed, the impurities such as dust and steel powder may be mixed in the interface between the laminated polyester resin film and the surface of the tin free steel or may stick on the surface of the polyester resin film laminated tin free steel. These impurities may act as the starting point for the birth of many cracks in the laminated polyester resin film during severe forming. These cracks deteriorate the corrosion resistance of the polyester resin film laminated tin free steel. For example, when some corrosive drinks such as a carbonated beverage or a sports drink is packed in the deeply drawn can made by the polyester resin film laminated tin free steel and then are stored for about one month at room temperature, perforations may arise from many cracks in the laminated polyester resin film of the formed part in the drawn can, because the TFS film does not prevent the corrosion of base steel exposed by severe forming which occurs electrochemically.

Therefore, the tin free steel covered with the polyester resin film is not suitable for industrial applications where excellent corrosion resistance after severe forming is required. If the polyester resin film laminated tin free steel is used for applications described above, the environment of the processes for laminating the polyester resin film on the tin free steel and forming the polyester resin film laminated tin free steel must be sufficiently controlled in order to prevent the mixture of these impurities into the polyester resin film laminated tin free steel.

BRIEF DESCRIPTION OF THE INVENTION

The first objective of the present invention can be accomplished by the lamination of a copolyester resin film on the surface treated steel sheet having double layers consisting of a lower layer of metallic chromium and an upper layer of hydrated chromium oxide on a tin plated steel sheet in which 5 to 40% of the surface of the steel sheet is covered with plated tin and a space between plated tin particles is 0.5 to 50 $\mu$m.

The second objective of the present invention can be accomplished by the lamination of the copolyester resin film at above the melting temperature of tin on the surface treated steel sheet in which tin is electroplated under restricted conditions which is characterized by a lower amount of additives in the tinplating electrolyte compared with those in the conventional tinplating electrolyte and then said double layer is uniformly formed on the plated tin and the exposed steel surface.

It is a very important point and an inventive feature in the present invention that the plated tin lies scattered after tinplating and metallic chromium is positively deposited on the surfaces of plated tin and the remaining exposed steel surface which was not plated with tin, and furthermore that the surface of the metallic chromium is uniformly covered with hydrated chromium oxide. It is considered that the surface treated steel sheet used as the base for the lamination of the polyester resin film in the present invention is a hybrid surface of a tin free steel and a tin plated steel sheet, in which demerits or problems are removed while merits and improvements are retained and made in both surface treated steel sheets.

The copolyester resin film laminated steel sheet according to the present invention can be used in applications wherein excellent corrosion resistance after severe forming, particularly excellent pitting corrosion resistance is required, such as deeply drawn cans, drawn and redrawn cans, drawn and stretch formed cans, drawn and partially ironed cans having high can hight and a high drawing partially ironed cans having high can hight and a high drawing ratio and can ends where a tab for easy opening is attached. Particularly, this copolyester resin film laminated steel sheet is suitable as a can material wherein corrosive contents such as carbonated beverages, juice and sports drinks are packed. Furthermore, the copolyester resin film laminated steel sheet according to the present invention can be used for screw caps and crown caps in contact with some corrosive contents.

DETAILED DESCRIPTION OF THE INVENTION

It is indispensable in the present invention that the surface treated steel sheet having all of the following factors is used as the base for the lamination of the copolyester resin film from the viewpoint of the adhesion to the laminated copolyester resin film and the corrosion resistance after severe forming. These factors are:

(1) 5 to 40% of the surface of steel sheet is covered with plated tin;
(2) A space between plated tin particles is 0.5 to 50 $\mu$m;
(3) An amount of plated tin is 200 to 4300 mg/m$^2$;
(4) A surface of tin plated steel sheet having features of (1) to (3) described above is uniformly covered with TFS film consisting of a lower layer of metallic chromium and an upper layer of hydrated chromium oxide; and
(5) An amount of metallic chromium and hydrated chromium oxide as chromium is 30 to 300 mg/m$^2$ and 5 to 30 mg/m$^2$, respectively, in said TFS film.

If the covering ratio of the steel surface by plated tin is below 5% which results when there is above 50 $\mu$m of space between plated tin particles, i.e. it is covered almost with only TFS film, then the corrosion of steel sheet is accelerated from cracks in the laminated copolyester resin film arising from severe forming, because the area plated with tin which effectively prevents the corrosion of steel sheet decreases. It is also not suitable in the present invention that the amount of plated tin is below 200 mg/m$^2$, because the corrosion of steel sheet is not prevented effectively by plated tin, even if the excellent adhesion of the laminated copolyester resin film is obtained. On the other hand, if the covering ratio of the steel surface by plated tin is above 40% and the space between plated tin particles is below 0.5 $\mu$m, the laminated copolyester resin film is easily peeled off by severe forming, although the corrosion of steel sheet is prevented effectively by an increase in the area plated with tin. Particularly, in above 4300 mg/m$^2$ of plated tin, the adhesion of the laminated copolyester resin film becomes noticeably poor.

For the reasons described above, it is preferable in the present invention that the state of tin plated steel sheet before the formation of TFS film is satisfied with factors (1) to (3) described above. More preferably, the covering ratio of the steel surface by plated tin is 10 to 30%, the space between plated tin particles is 2 to 20 $\mu$m and the amount of plated tin is 1000 to 3000 mg/m$^2$.

In the present invention, it is indispensable that the tin plated steel sheet having features described above is uniformly covered with TFS film consisting of metallic chromium and hydrated chromium oxide.

It is preferable in the present invention that the amount of metallic chromium and hydrated chromium oxide as chromium is in the range of 30 to 300 mg/m$^2$ and 5 to 30 mg/m$^2$, more preferably 5 to 200 mg/m$^2$ and 7 to 20 mg/m$^2$, respectively, in the TFS film formed on tin plated steel sheet.

If the amount of hydrated chromium oxide is above 30 mg/m$^2$ or below 5 mg/m$^2$ as chromium, the bonding strength to the copolyester resin film becomes noticeably poor in severely formed areas. Particularly, with below 5 mg/m$^2$ as chromium of the hydrated chromium oxide, the corrosion resistance in the area covered with only TFS film becomes noticeably poor.

In the case of below 30 mg/m$^2$ of metallic chromium, the corrosion resistance in the area covered with only TFS film becomes poor, even if the amount of hydrated chromium oxide as chromium is 5 to 30 mg/m$^2$. The deposition of metallic chromium above 300 mg/m$^2$ is not suitable in the continuous production of the copolyester resin film laminated steel sheet according to the present invention at high speed, although the adhesion of said copolyester resin film does not become remarkably poor.

The surface treated steel sheet used as the base for the lamination of the copolyester resin film in the present invention is easily produced by the following process: degreasing with an alkali and pickling with an acid, followed by water rinsing, which is followed by electrotinplating by using a special electrolyte followed by water rinsing, which is followed by formation of TFS film, which is followed by water rinsing, and then followed by drying.

In order to obtain the tin plated steel having features described above, the steel sheet is plated with tin by using an electrolyte having the following composition under a cathodic current density of 15 to 40 A/dm² at an electrolyte temperature of 40° to 60° C. used for conventional electrotinplating.

Composition of tinplating electrolyte:
Concentration of stannous sulfate: 20 to 100 g/l
Concentration of phenolsulfonic acid: 20 to 80 g/l
Concentration of additives: 0.05 to 0.12 g/l Ethoxylated α-naphthol or ethoxylated α-naphtholsulfonic acid are used as additives for tinplating electrolyte described above.

In the composition of tinplating electrolyte described above, the concentration of additives is very important in order to obtain a tin plated steel sheet having features described above.

Figure 1:
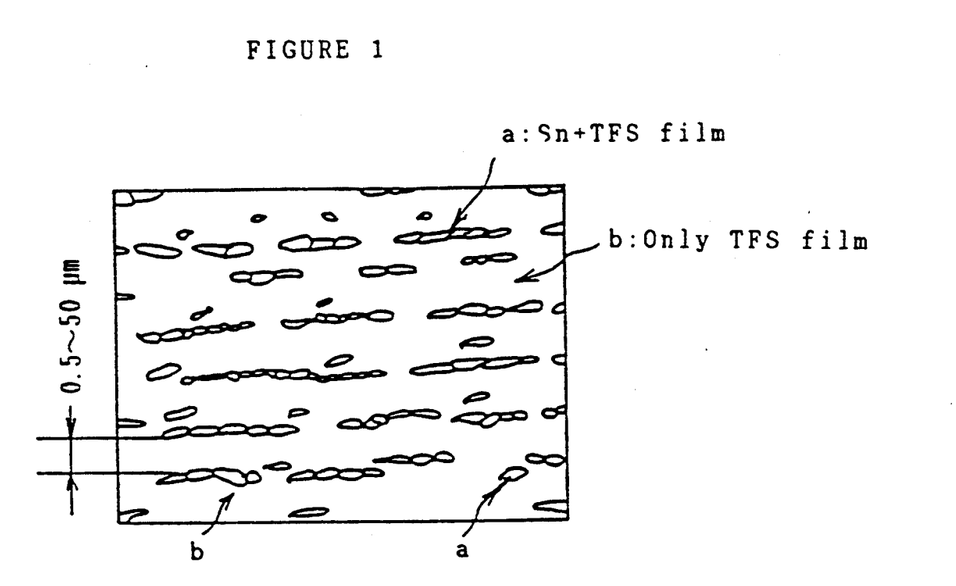
FIG. 1 depicts a magnified schematic diagram which is observed from the surface in the surface treated steel sheet used as the base for the lamination. A shows a part plated with tin, B shows a part not plated with tin, and the part of A and B is covered with double layers consisting of a lower layer of metallic chromium and an upper layer of hydrated chromium oxide.
Figure 2:
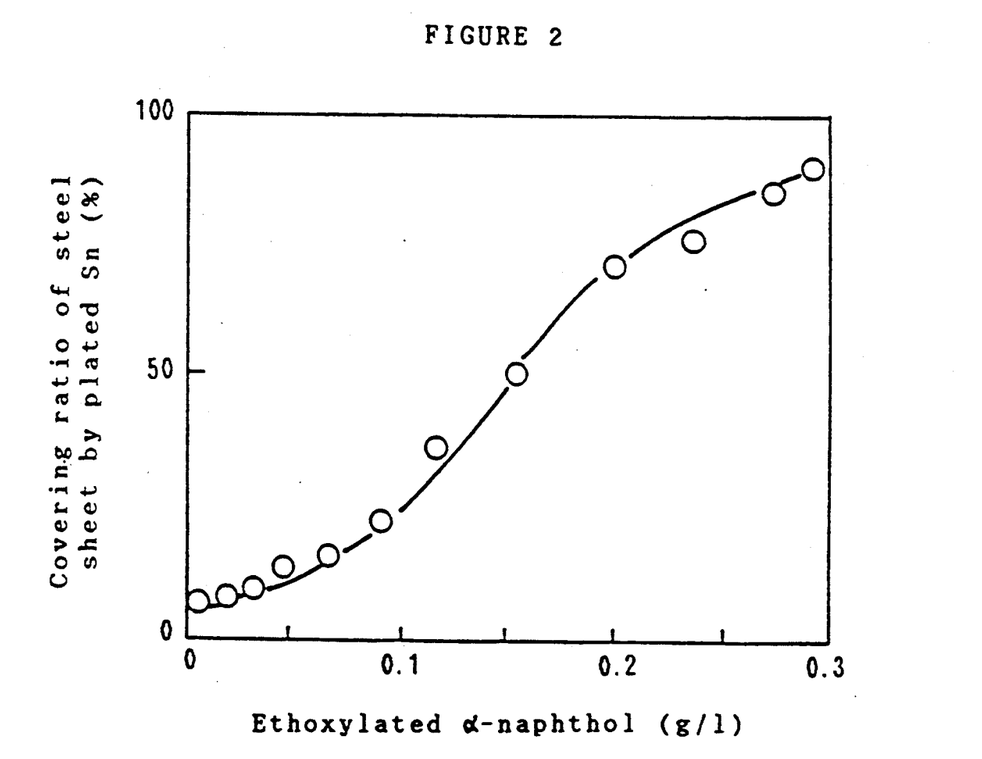
FIG. 2 depicts the relationship between the amount of additives in tinplating electrolyte and the covering ratio of the steel surface by the plated tin.

As shown in FIG. 2, the covering ratio of the surface of the steel sheet by plated tin increases with an increase in the concentration of additives. With below 0.12 g/l of additives, the covering ratio of the steel surface by plated tin is below 40%. The concentration of additives below 0.05 g/l is not suitable in the tinplating electrolyte used in the present invention, because the adhesion of plating tin to the steel sheet becomes poor and plated tin is easily peeled off from the surface of the steel sheet by contact with a conductor roll or a sink roll in an electrotinplating section. At above 0.12 g/l in the concentration of additives, excellent adhesion of copolyester resin film to the surface treated steel sheet is not obtained because the greater part of the steel surface is uniformly covered with plated tin, even if TFS film is uniformly formed on the tin plated steel sheet.

It has been known by U.S. Pat. No. 4,816,348 that a low tin plated steel sheet wherein 30 to 80% of the surface of the steel sheet is covered with plated tin and an effective diameter of an irregularly shaped plated area, which is defined as the diameter of a circle having the identical area, is controlled between 0.5 and 20 μm is obtained by using an electrolyte containing 30 to 80 g/l of stannous sulfate, 15 to 60 g/l of acid as sulfuric acid and 0.2 to 2 g/l of ethoxylated α-naphthol additive under a cathodic current density of 2 to 10 A/dm² at an electrolyte temperature of 40° to 60° C. However, the tin plated steel sheet obtained by this method described above is poor in the adhesion of the laminated copolyester resin film, even if TFS film is uniformly formed, because the plated tin is present in a large lump and the formed TFS film is destroyed by melting of the plated tin. Furthermore, this method is poor in productivity because the low current density is indispensable.

The tin plated steel sheet produced under the conditions described above is covered with TFS film. For the formation of said TFS film on the tin plated steel sheet, the following two methods which are used for the production of TFS are utilized:

1) The one is a two-step process in which metallic chromium is plated and then hydrated chromium oxide is formed on the metallic chromium layer.
2) The other is one-step process in which said TFS film is simultaneously formed on the tin plated steel sheet. However, the one step process has merit with a view to use of less equipment.

In the present invention, the TFS film is formed on the tin plated steel sheet by cathodic electrolysis in an electrolyte containing 50 to 100 g/l of chromic acid and an optimum amount of additives such as fluorine compounds and/or sulfuric acid under a cathodic current density of 40 to 80 A/dm² at an electrolyte temperature of 40° to 60° C. It is preferable to use higher current density in order to form the TFS film uniformly.

It is preferable that the amount of sulfuric acid and/or a fluorine compound added to the chromic acid solution is 1 to 5% of chromic acid. The fluorine compound is selected from the group consisting of hydrofluoric acid, fluoboric acid, fluosilicic acid, ammonium bifluoride, an alkali metal bifluoride, ammonium fluoride, an alkali metal fluoride, ammonium fluoborate, and alkali metal fluoborate, ammonium fluosilicate and an alkali metal fluosilicate.

In the present invention, the copolyester resin film to be used should be selected from the copolyester resin film prepared by processing according to known methods and comprising a copolyester resin consisting of 75 to 99 mole % of polyethylene terephthalate and 1 to 25 mole % of a polyester resin which is produced by the esterification of at least one saturated polycarboxylic acid with at least one saturated polyalcohol selected from the following polycarboxylic acids and polyalcohols.

Saturated polycarboxylic acids are selected from phthalic acid, isophthalic acid, terephthalic acid, succinic acid, azelaic acid, adipic acid, sebacid acid, diphenylcarboxylic acid 2,6-naphthalene dicarboxylic acid, 1,4-cyclohexane dicarboxylic acid and trimellitic acid anhydride.

Saturated polyalcohols are selected from ethylene glycol, 1,4-butanediol, 1,5-pentanediol, 1,6-hexanediol, propylene glycol, polytetoramethylene glycol, trimethylene glycol, triethylene glycol, neopenthyl glycol, 1,4-cyclohexane dimethanol, trimethylol propane and pentaerythritol.

Furthermore, the use of the biaxially oriented copolyester resin film is preferable from the viewpoints of the formability and anti-permeability of the copolyester resin film.

In some cases, additives such as antioxidants, stabilizer, pigments, anti-static agent, lubricants and corrosion inhibitors are added during the manufacturing process of the copolyester resin film used for the present invention.

The thickness of the copolyester resin film used in the present invention should be 5 to 50 μm. If the thickness of the employed copolyester resin film is below 5 μm, good corrosion resistance after formation of the copolyester resin film laminated steel sheet according to the present invention is not obtained and the continuous lamination of thin copolyester resin film to the surface treated steel sheet becomes noticeably difficult. The use of copolyester resin film having a thickness above 50 μm is not economically suitable for the film to be laminated to the surface treated steel sheet, because the copolyester resin film used for the present invention is expensive as compared with epoxy phenolic lacquers widely used in the can industry.

Furthermore, it is preferable from the viewpoint of filiform corrosion resistance of the copolyester resin film laminated steel sheet according to the present invention, that the one side of the employed copolyester resin film which is contact with the surface treated steel sheet is precoated with 0.1 to 5.0 g/m² of a resin composite containing at least one radical selected from the group consisting of an epoxy radical, a hydroxyl radical, an amide radical, an ester radical, a carboxyl radical, a urethane radical an acrylic radical and an amino radical. Epoxy resin, nylon resin, polyester resin, modified vinyl resin, urethane resin, acrylic resin and urea resin are examples of such resin composites.

It is desirable that the resin composite be coated on one side of the employed copolyester resin film as uniformly and thinly as possible. This is because the bonding strength of resin composite layer to the surface treated steel sheet and the copolyester resin film becomes gradually poorer with an increase in the thickness of the precoated resin composite. However, it is very difficult to uniformly coat in amounts below 0.1 g/m$^2$ of the resin composite on the copolyester resin film. Furthermore when the amount of the resin composite is below or above 5.0 g/m$^2$, the bonding strength of the resin composite layer to the surface treated steel sheet and the copolyester resin film becomes noticeably poor in severely formed areas.

It is preferable that the resin composite is diluted by a solvent and then coated by a roller or spray method in order to form a uniform and thin resin composite layer on the copolyester resin film. If the temperature for drying a resin composite diluted by a solvent which is coated on one side of the copolyester resin film is below 60° C., a long time is required for the removal of solvent and the formed resin composite layer becomes tacky. When the drying temperature is above 150° C., the chemical reaction of the resin composite coated on the copolyester resin film is accelerated, and the bonding strength of the resin composite to the surface treated steel sheet becomes noticeably poor. It is preferable that the drying time of the resin composite solution coated on the copolyester resin film is 5 to 30 seconds at a temperature of 60° to 150° C. If the drying time is less than 5 seconds, the solvent is not sufficiently removed. On the other hand, a drying time of more than 30 seconds results in poor productivity.

It is usually impossible to laminate the polyester resin film to an electrotinplate which is heated to above the melting temperature of tin, because the plated tin is melted. However, the lamination of polyester resin film to the surface treated steel sheet used in the present invention which is heated to above the melting temperature of tin can be carried out, because the plated tin which lies scattered does not flow continuously by heating to above the melting temperature of tin. Therefore, the copolyester resin film having higher melting temperature than that of tin can be used in the present invention. However, if the copolyester resin film is laminated to the surface treated steel sheet which is heated to above the melting temperature (Tm)+50° C., the copolyester resin film laminated steel sheet having excellent corrosion resistance after forming is not obtained, because the large amount of noncrystalline copolyester resin layer is formed in the interface between a biaxially oriented copolyester resin layer and the surface treated steel sheet. On the other hand, if the laminating temperature is below Tm, the laminated copolyester resin film is easily peeled off by severe forming. Therefore, it is preferable in the present invention that the copolyester resin film is laminated to the surface treated steel sheet which is heated to a temperature which is Tm to Tm+50° C. and above the melting temperature of tin.

In the present invention, the method for heating the surface treated steel sheet to which the copolyester resin film is laminated is not especially limited. However, from the continuous and stable production of the copolyester resin film laminated steel sheet according to the present invention at high speed, conduction heating by a roller heated by induction heating, induction heating and/or resistance heating which are used for reflowing electrotinplate in the production process of electrotinplate is suitable as the method for heating the surface treated steel sheet, because the surface treated steel sheet can be rapidly heated and the temperature of the heated steel sheet can be easily controlled. Furthermore, it is also preferable in the present invention that heating with a roller heated by hot steam or heating in an electric oven can be used as an auxiliary method for preheating the surface treated steel sheet to be laminated.

A method for cooling after the lamination of copolyester resin film to the surface treated steel sheet is not limited to rapidly cooling or gradually cooling, because the slight amount of the noncrystalline copolyester resin layer is only formed at the interface between biaxially oriented copolyester resin film and the surface treated steel sheet and then the obtained characteristics do not change by both methods, if the laminating temperature is not remarkably higher than Tm.

The present invention is explained in further detail by reference to the following examples. It will be understood that the specification and examples are illustrative but not limitative of the present invention and that other embodiments within the spirit and scope of the invention will suggest themselves to those skilled in the art.

EXAMPLE 1

A cold rolled steel sheet having a thickness of 0.21 mm was electrolytically decreased in a solution of 70 g/l sodium hydroxide and then pickled in a solution of 100 g/l sulfuric acid. The steel sheet, after being rinsed with water, was electroplated with tin under the following conditions (A). After rinsing with water, the tin plated steel sheet was cathodically treated under the following conditions (B) for the formation of TFS film and then was rinsed with water and dried.

After that, a biaxially oriented copolyester resin film having characteristics shown in (C) was laminated on both surfaces of the thus treated steel sheet under the following conditions (D).

Conditions for tin plating

Composition of tin plating electrolyte,
SnSO$_4$:80 g/l
Phenolsulfonic acid (65% solution):60 g/l
Ethoxylated α-naphthol:0.06 g/l
Temperature of electrolyte:45° C.
Cathodic current density:20 A/dm$^2$
Flow speed of electrolyte:300 m/minutes
Amount of plated tin:1300 mg/m$^2$ Conditions for the formation of film Composition of electrolyte:
CrO$_3$:50 g/l
H$_2$O$_4$:0.5 g/l
Temperature of electrolyte:50° C.
Cathodic current density:40 A/dm$^2$
Amount of metallic chromium:95 mg/m$^2$
Amount of hydrated chromium oxide:11 mg/m$^2$ as Cr (C) Characteristics of the employed copolyester resin film Thickness 25 μm
Melting temperature:240° C.

Refractive indexes in all planar dimensions:1.6598
Refractive index in thickness direction:1.5175
Type of the added lubricant:$SiO_2$
Average particle size of added lubricant:1.5 μm
Amount of added lubricant:0.07 weight % relative to the weight of the employed copolyester resin
Composition of precoated resin composite:
Epoxy resin 80 parts
Resole product from paracresol: 20 parts
Drying temperature of precoated resin composite:120° C.
Amount of precoated resin composite after drying:0.25 g/m$^2$ (D) Conditions for lamination of copolyester resin film Method for heating the treated steel sheet:
Roller heated by induction heating
Temperature of the treated steel sheet just before lamination:260° C.
Method for cooling after lamination:Rapid cooling by water

EXAMPLE 2

The same steel sheet pretreated as in Example 1 was electroplated with 2700 mg/m$^2$ of tin under the same conditions (A) as in Example 1 except for the amount of additive in the tin plating electrolyte. After rinsing with water, TFS film consisting of 83 mg/m$^2$ of metallic chromium and 14 mg/μm$^2$ of hydrated chromium oxide as chromium was formed on the tin plated steel sheet by using the same conditions (B) as in Example 1. The thus treated steel sheet was rinsed with water and dried.

After that, a biaxially oriented copolyester resin film having the same characteristics (C) as in Example 1 was laminated on both surfaces of the thus treated steel sheet, heated to 240° C. and then the laminate was gradually cooled.

Ethoxylated α-naphthol: 0.01 g/l

EXAMPLE 3

The same steel sheet pretreated as in Example 1 was electroplated with tin under the following conditions (A). After rinsing with water, the tin plated steel sheet was treated under the following conditions (B). The thus treated steel sheet was rinsed with water and dried.

After that, a biaxially oriented copolyester resin film having characteristics shown in (C) was laminated on both surfaces of the thus treated steel sheet under the following conditions (D).

(A) Conditions for tin plating

Compositions of tin plating electrolyte:
$SnSO_4$:60 g/l
Phenolsulfonic acid (65% solution):40 g/l
Ethoxylated α-naphthol sulfonic acid:0.08 g/l
Temperature of electrolyte:45° C.
Cathodic current density:25 A/dm$^2$
Flow speed of electrolyte:300 m/minutes
Amount of plated tin:1300 mg/m$^2$ Conditions for formation of film Composition of electrolyte:
$CrO_3$:80 g/l
$H_2SO_4$:0.5 g/l
NaF:0.5 g/l
Temperature of electrolyte:55° C.
Cathodic current density:40 A/dm$^2$
Amount of metallic chromium:120 mg/m$^2$
Amount of hydrated chromium oxide:17 mg/m$^2$ as chromium (C) Characteristics of the employed copolyester resin film Thickness:25 μm
Melting temperature:230° C.
Refractive indexes in all planar dimensions:1.6475
Refractive index in thickness direction:1.5264
Type of added lubricant:$SiO_2$
Average particle size of added lubricant:1.5 μm
Amount of added lubricant:0.07 weight % relative to the weight of the employed copolyester resin (D) Conditions for lamination of copolyester resin film Temperature of the treated steel sheet just before lamination:260° C.
Method for cooling after lamination:Rapid cooling by water

EXAMPLE 4

The same steel sheet pretreated as in Example 1 was electroplated with 3200 mg/m$^2$ of tin under the same conditions (A) as in Example 3. After rinsing with water, TFS film consisting of 50 mg/m$^2$ of metallic chromium and 8 mg/m$^2$ of hydrated chromium oxide as chromium was formed on the tin plated steel sheet under the same conditions (B) as in Example 3. The thus treated steel sheet was rinsed with water and dried.

After that, a biaxially oriented copolyester resin film having the same characteristics (C) as in Example 3 was laminated on both surfaces of the thus treated steel sheet heated to 260° C. and then immersed into hot water having a temperature of 80° C., and after that, was gradually cooled.

COMPARATIVE EXAMPLE 1

The same steel sheet pretreated as in example 1 was electroplated with tin under the following conditions (A). After rinsing with water, TFS film consisting of 90 mg/m$^2$ of metallic chromium and 13 mg/m$^2$ of hydrated chromium oxide as chromium under the same conditions (B) as in Example 1 was formed on the tin plated steel sheet. The thus treated steel sheet was rinsed with water and dried.

After that, a biaxially oriented copolyester resin film having the same characteristics (C) used in Example 1 was laminated on both surfaces of the thus treated steel sheet under the same conditions (D) as in Example 1, (A) Conditions for tin plating Composition of tin plating electrolyte
$SnSO_4$:80 g/l
Phenolsulfonic acid (65% solution): 60 g/l
Ethoxylated α-naphthol:7 g/l
Temperature of electrolyte: 45° C.
Cathodic current density: 20 A/dm$^2$
Flow speed of electrolyte:300 m/minutes
Amount of plated tin:2700 mg/m$^2$

COMPARATIVE EXAMPLE 2

The same steel sheet pretreated as in Example was electroplated with 1800 mg/m$^2$ tin under the same conditions (A) as in Example 1. After rinsing with water, TFS film consisting of 11 mg/m$^2$ of metallic chromium and 4 mg/m$^2$ of hydrated chromium oxide as chromium was formed on the tin plated steel sheet under the same conditions (B) as in Example 1. The thus treated sheet was rinsed with water and dried.

After that, a biaxially oriented copolyester resin film having the same characteristics (C) as in Example 1 was laminated on both surfaces of the thus treated steel sheet under the same conditions as in Example 1.

COMPARATIVE EXAMPLE 3

The same steel sheet pretreated as in Example 1 was electroplated with tin under the following conditions (A). After rinsing with water, TFS film consisting of 56 mg/m$^2$ of metallic chromium and 14 mg/m$^2$ of hydrated chromium oxide as chromium was formed on the tin plated steel sheet. The thus treated steel sheet was rinsed with water and dried.

After that, a biaxially oriented copolyester resin film having the same characteristics (C) used in Example 3 was laminated on both surfaces of the thus treated steel sheet under the same conditions (D) as in Example 3.

(A) Conditions for tin plating

Composition of tin plating electrolyte
$SnSO_4$:80 g/l
Phenolsulfonic acid (65 % solution):60 g/l
Ethoxylated α-naphthol:0.3 g/l
Temperature of electrolyte:45° C.
Cathodic current density:5 A/dm$^2$
Flow speed of electrolyte:300 m/minutes
Amount of plated tin:2800 mg/m$^2$

COMPARATIVE EXAMPLE 4

The same steel sheet pretreated as in Example 1 was treated under the following conditions (A) for the formation of TFS film. The thus treated steel sheet was rinsed with water and dried.

After that, a biaxially oriented copolyester resin film having the same characteristics (C) used in Example 1 was laminated on both surfaces of the thus treated steel sheet under the same conditions (D) as in Example 4.

(A) Conditions for formation of film

Composition of electrolyte:
$CrO_3$:100 g/l
$H_2SO_4$:0.8 g/l
NaF:2.0 g/l
Temperature of electrolyte:50° C.
Cathodic current density:40 A/dm$^2$
Flow speed of electrolyte:300 m/minutes
Amount of metallic chromium:102 mg/m$^2$
Amount of hydrated chromium oxide:17 mg/m$^2$ as chromium The characteristics of the resultant steel sheet were evaluated by the following testing methods, after measurement of the coating weight on the resultant steel sheet by the X-ray fluorescent method. The results are shown in the Table.

(1) Covering ratio of steel surface by plated tin and space between plated tin particle:

The scanning electromicrograph of the surface treated steel sheet obtained by 400 magnification was divided in to a white part in which the steel surface is plated with tin and a black part in which the steel surface is covered with only TFS film by using the image analyzer. After that, the covering ratio of the steel surface by plated tin is determined by the ratio of the area in the white part to that in the black part.

The space between plated tin particles was determined by the value measured by using slide calipers divided by the 400 magnification in the same scanning electromicrograph. These values are an average value of 10 range of vision measured by the methods described above, respectively.

(2) Formability by deep drawing:

The resultant steel sheet was cut by a punch press to a circular blank having a diameter of 158 mm. The blank was deeply drawn to form a cylindrical cup at a drawing ratio of 2.92. The formability of the resultant steel sheet was evaluated by the degree of cracks in the copolyester resin film and the degree in the peeling off of the copolyester resin film in the formed area and then divided into the following 3 ranks:

| Evaluation | Degrees of cracks and peeling off of film |
|---|---|
| Excellent | 0% |
| Fair | Less than 20% |
| Poor | More than 20% |

(3) Corrosion resistance after cup drawing:

50 pieces of the cylindrical cup obtained by the method described above in method (2) were filled with carbonate beverage (Coca Cola) and stored at 37.5° C. After 3 months, the corrosion resistance of the resultant steel sheet was evaluated by the ratio of perforated can.

TABLE

| | Ex. 1 | Ex. 2 | Ex. 3 | Ex. 4 | Comp. Ex. 1 | Comp. Ex. 2 | Comp. Ex. 3 | Comp. Ex. 4 |
|---|---|---|---|---|---|---|---|---|
| Coating weight (mg/m$^2$) | | | | | | | | |
| Sn | 1300 | 2700 | 1300 | 3200 | 2700 | 1800 | 2800 | 0 |
| Metallic Cr | 95 | 83 | 120 | 50 | 90 | 11 | 56 | 102 |
| Cr in hydrated Cr oxide | 11 | 14 | 17 | 8 | 13 | 4 | 14 | 17 |
| Kind of laminated film | B | B | A | A | B | B | A | B |
| Covering ratio by plated Sn (%) | 7 | 18 | 12 | 24 | 99~100 | 16 | 71 | 0 |
| Space between Sn particles (μm) | 1~25 | 2~16 | 3~21 | 5~10 | 0 | 3~14 | <0.5 | — |
| Test result | | | | | | | | |
| Adhesion of laminated film | Good | Good | Good | Good | Poor | Fair | Poor | Good |
| Ratio of perforated can (%) | 0 | 0 | 0 | 0 | No test | 0 | No test | 37 |

Remarks:
A represents polyester resin film without resin composite.
B represents polyester resin film precoated with resin composite.

What is claimed is:

1. A co-polyester rein film laminated steel sheet composition comprising a discontinuous tin-plated steel sheet wherein the discontinuous tin-plated steel sheet is further coated with a uniform double layer consisting of greater than 30 to 300 mg/m$^2$ lower layer of metallic chromium and a 5-30 mg/m$^2$ upper layer of hydrated chromium oxide wherein the covering ratio of the steel surface by plated tin is 5 to 30%, space between plated tin particles is 0.5 to 5 μm and the amount of plated tin is more than 1300 mg/m$^2$ and less than 4300 mg/m$^2$ and further comprising a laminated layer superimposed on the chromium bilayer on at least one side of the steel sheet wherein the laminated layer comprises a biaxially oriented copolyester resin film.

2. The copolyester resin film laminated tin-plated steel sheet having a chromium bilayer according to claim 1, wherein said copolyester resin film comprises from about 75 to about 99 mole % of polyethylene terephthalate and from about 1 to 25 mole % of a polyester resin produced by esterification of at least one saturated polycarboxylic acid selected from the group consisting of phthalic acid, isophthalic acid, terephthalic acid, succinic acid, azelaic acid, adipic acid, sebacic acid, diphenylcarboxylic acid, 2,6-naphthalene dicarboxylic acid, 1,4-cyclohexane dicarboxylic acid and trimellitic acid anhydride with at least one saturated polyalcohol selected from the group consisting of ethylene glycol, 1,4-butane diol, 1,5-pentane diol, 1,6-hexane diol, propylene glycol, polytetramethylene glycol, trimethylene glycol, triethylene glycol, neopentyl glycol, 1,4-cyclohexane dimethanol, trimethylol propane and pentaerythritol.

3. The copolyester resin film laminated tin-plated steel sheet having a chromium bilayer of claim 1 wherein said copolyester resin film has a thickness of about 5 to about 50 μm.

4. The copolyester resin film laminated tin-plated steel sheet having a chromium bilayer of claim 1, wherein the side of said copolyester resin film in contact with said surface treated steel sheet is precoated with a resin composite having at least one radical selected from the group consisting of an epoxy, a hydroxy, an amide, an ester, a carboxyl, a urethane, an acrylic and an amino radical.

5. The copolyester resin-film-laminated tin-plated steel sheet having a chromium bilayer of claim 4, wherein the amount of said resin composite precoated on the side of said copolyester resin film is from about 0.1 to about 5.0 g/m².

6. The laminated steel sheet of claim 4 wherein the resin composite is selected from the resin group consisting of epoxy, nylon, polyester, modified vinyl, urethane, acrylic and urea.

7. The laminated steel sheet of claim 4 wherein the resin composite has a drying time range of about 5 to 30 seconds at a temperature range of about 60° to 150° C.

8. The laminated steel sheet of claim 1 wherein a laminating temperature range is about Tm to Tm +30° C., where Tm is the melting temperature of the copolyester resin film.

* * * * *

UNITED STATES PATENT AND TRADEMARK OFFICE
CERTIFICATE OF CORRECTION

PATENT NO. : 5,213,903
DATED : May 25, 1993
INVENTOR(S) : Hiroaki Kawamura, et al.

It is certified that error appears in the above-indentified patent and that said Letters Patent is hereby corrected as shown below:

Col. 8, line 60: delete "$H_2O_4$" and insert -- $H_2SO_4$ --.

Col. 11, line 40: after "formation of" and before "film" insert -- TFS --.

Col. 14, line 22: delete "30°" and insert -- 50° --.

Signed and Sealed this

Twenty-ninth Day of November, 1994

Attest:

BRUCE LEHMAN

Attesting Officer

Commissioner of Patents and Trademarks